Feb. 13, 1968   C. H. SCHEIDT, JR   3,368,299
FISHING HOOK
Filed Sept. 23, 1965
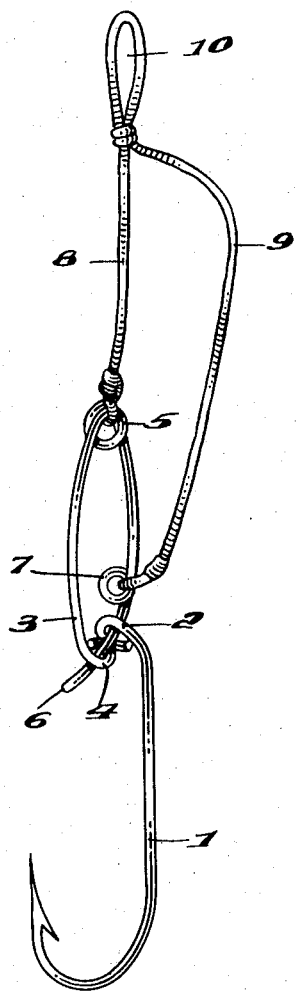

United States Patent Office 3,368,299
Patented Feb. 13, 1968

3,368,299
FISHING HOOK
Charles Henry Scheidt, Jr., Essex, Md.
(2102 Southorn Road, Baltimore, Md. 21220)
Filed Sept. 23, 1965, Ser. No. 489,564
3 Claims. (Cl. 43—43.12)

This invention relates to a fishing hook, more particularly to the leader assembly to attach the fishing hook to the line.

It is well known that in a conventional fishing hook having a leader with a looped end to which the line is attached that if the fish should swallow the hook, the most expedient thing to do is to cut the leader and/or the line and attach a new leader and fishing hook to the line.

If the fisherman is in a school of fish and a fish swallows the hook, it is very time consuming to replace the leader and hook or to attempt to extract the hook from the fish. It is very frustrating under this circumstance to be in a school of fish and have to take the time required to cut and rig a new hook on the line.

It is an object of this invention to provide a fishing hook and leader, which hook can readily be detached, if it is swallowed by the fish, and a new hook put in place with a minimum loss of time.

It is another object of this invention to provide a fishing hook and leader for a fish line that will function in all respects like the normal fishing hook and leader yet have the advantage of quick replaceability.

Further and other objects will become apparent from the description of the accompanying drawing:

The drawing illustrates a fishing hook and leader in which a fishing hook 1 is formed with a loop or eye at its top 2. Instead of connecting the loop 2 to the leader, a hook release 3 is provided consisting of a formed resilient metal wire. The hook release has formed adjacent one end a bent portion that may be U-shaped or in the form of a closed loop or eye 4. It also has formed intermediate the ends a complete loop or eye 5. The other end of the hook release wire 3 or the free end 6 is left unformed and is extended through the loop or eye 4 to form a hook release latch. Eye 2 of the fishing hook is placed on the straight end 6 prior to inserting end 6 through the loop or eye 4.

The side having straight end 6 is formed intermediate end 6 and loop 5 with a loop 7 preferably placed closer to the portion 6, supporting the hook, than to the line attachment eyelet 5.

A line 8 is secured to eyelet 5 and formed with a conventional loop 10 to which the fishing line will be attached. Another line extends from the base of the loop shown as 9 and is secured to eye 7. Line 9 is referred to as a release line secured to the hook release and has some slack in it so that the load on the hook is transferred to the line through line 8 and hook release 3.

Loop 10 is secured to the fishing line in the normal fashion. Line 8 and hook release 3 connected to hook 1 form the normal assembly of a fishing hook and leader.

In the event a fish should swallow the hook, pulling on line 8 will only more firmly implant it in the fish. However, pulling on line 9 will pull portion 6 of the hook release member through eyelet 4 of the hook release member thereby releasing the hook 1 to remain with the fish. A new hook 1 can readily be threaded over member 6 and member 6 inserted in eyelet 4 and the fish hook and leader are again ready for baiting and the next catch.

While portion 4 of the hook release member 3 has been referred to in the appended claims as a "loop," it is to be understood that such a loop may be a closed loop, or an open or U-shaped loop.

It is to be understood that certain changes, alterations, modifications and substitutions can be made without departing from the spirit and scope of the appended claims.

What is claimed is:

1. A fishing line leader assembly for a fishing line comprising a hook member having a loop formed in the end thereof remote from the hook, a hook release member comprising a bent wire formed intermediate its ends with a fishing line engaging portion, one end of said hook release member formed with a loop and the other end being straight and extending through said loop in said hook member and said loop of said release member, a slack hook release line secured to said straight end to pull said straight end through said loops.

2. The device as set forth in claim 1, in which the side of the wire having said straight end is provided with a loop, said slack line being secured to said last mentioned loop, said last mentioned loop being positioned intermediate said straight end and said fishing line engaging portion.

3. The device as set forth in claim 1, in which said fishing line engaging portion is formed by a loop in said wire.

References Cited

UNITED STATES PATENTS

| 229,031 | 6/1880 | Campbell | 24—161 X |
| 1,420,952 | 6/1922 | Bentley | 24—161 |
| 2,224,161 | 12/1940 | Rice | 24—161 X |
| 2,823,486 | 2/1958 | Behee | 43—44.83 X |
| 2,988,395 | 6/1961 | Rogers | 43—43.12 X |
| 3,081,574 | 3/1963 | Wise | 43—43.12 |

FOREIGN PATENTS 1,067,746   1/1954   France.

SAMUEL KOREN, Primary Examiner.
J. H. CZERWONKY, Assistant Examiner.